United States Patent [19]
Volz et al.

[11] Patent Number: 5,302,011
[45] Date of Patent: Apr. 12, 1994

[54] BRAKING PRESSURE CONTROL DEVICE FOR A HYDRAULIC AUTOMOTIVE VEHICLE BRAKE SYSTEM

[75] Inventors: Peter Volz, Darmstadt; Bernd Schopper, Kriftel, both of Fed. Rep. of Germany

[73] Assignee: Alfred Teves GmbH, Frankfurt am Main, Fed. Rep. of Germany

[21] Appl. No.: 859,495
[22] PCT Filed: Oct. 10, 1991
[86] PCT No.: PCT/EP91/01924
§ 371 Date: Jun. 12, 1992
§ 102(e) Date: Jun. 12, 1992
[87] PCT Pub. No.: WO92/06874
PCT Pub. Date: Apr. 30, 1992

[30] Foreign Application Priority Data
Sep. 16, 1990 [DE] Fed. Rep. of Germany ....... 4130729
Oct. 16, 1990 [DE] Fed. Rep. of Germany ....... 4032797

[51] Int. Cl.$^5$ .............. B60T 8/40; B60T 8/42
[52] U.S. Cl. ............. 303/116.1; 303/116.4; 417/568
[58] Field of Search ......... 303/10, 11, 115.4, 115.5, 303/116.1, 116.2, 116.4, DIG. 1, DIG. 2; 417/568

[56] References Cited
U.S. PATENT DOCUMENTS 2,845,029  7/1958  Gratzmuller ................ 417/295
4,715,666 12/1987  Farr ........................... 303/116.4
4,883,327 11/1989  Farr ........................... 303/116.4

FOREIGN PATENT DOCUMENTS
1211154  9/1986  Japan ......................... 303/116.4
0136548  2/1989  Japan .

Primary Examiner—Robert J. Oberleitner
Assistant Examiner—Josie A. Ballato
Attorney, Agent, or Firm—Robert P. Seitter; J. Gordon Lewis

[57] ABSTRACT

A braking pressure control device for a brake system comprising a braking pressure generator (16), a wheel brake cylinder connected via a brake line (15) with the latter to actuate a brake (18), a braking pressure control circuit which is interposed into the brake line and comprising a piston pump, the outlet valve (9) of which is connectible to the brake line (15), and comprising solenoid operated brake control valves (19, 20), the inlet valve (8) and the outlet valve (9) of the piston pump are arranged on the pump housing (1), and the difference in pressure for opening the inlet valve (8) is such that the inlet valve (8) remains closed whenever the pressure in the return line (21) is below atmospheric pressure. An annular chamber (11) encircling the piston (3) is provided on the side of the slide seal (12) remote from the working chamber (7) of the piston pump, the annular chamber being sealed in relation to the eccentric piston drive housing portion (4) and communicating with a pump supply line connected to the brake pressure line (15), or with the return line (21) so as to supplied with fluid and prevent air from entering the working chamber through the piston clearance space.

4 Claims, 2 Drawing Sheets

BRAKING PRESSURE CONTROL DEVICE FOR A HYDRAULIC AUTOMOTIVE VEHICLE BRAKE SYSTEM

BACKGROUND OF THE INVENTION

The present invention relates to a braking pressure control device for an antilocking automotive vehicle brake system. Such systems typically include a braking pressure generator, at least one wheel brake cylinder connected via a brake line with the braking pressure generator to actuate a brake, a braking pressure control circuit which is interposed into the brake line between the braking pressure generator and the wheel brake cylinder. Such systems have a piston pump, the outlet of which is connectible to the brake line, and an inlet control valve controllable by a control device to connect the wheel brake cylinder with the brake line and an outlet valve connected in a return line leading to the inlet of the piston pump. The piston of the piston pump is axially movable by a mechanical eccentric drive and is sealed in relation to the cylinder bore in the pump housing by means of a slide seal.

Braking pressure control devices of this type automatically control the braking pressure in dependence on the rotational movement of one or more of the wheels of a vehicle, which movement is monitored by a monitoring device in order to prevent locking of the wheels during a braking operation and, in case of need, also to prevent spinning of the driven wheels on starting to drive.

A braking pressure control device of the type referred to hereinabove is taught by U.S. Pat. No. 4,715,666. To reduce the braking pressure in the wheel brake cylinder with a braking pressure control device of this type, the brake line leading to the wheel brake cylinder is connected to the return line by opening of an electromagnetic control outlet valve, the return line being in direct communication with the inlet of the piston pump without the intermediary of a reservoir open towards the atmosphere. The piston pump supplies the pressure fluid out of the return line back into the brake line in order to thereby re-increase the braking pressure on the wheel brake cylinder after a renewed closing of the control outlet valve. The connection between the pump outlet and the wheel brake cylinder is governed by a pressure-controlled flow control valve which interrupts or throttles the pressure fluid supply from the piston pump to the wheel brake cylinder when the control valve is open. A low-pressure accumulator connected to the return line has a spring-loaded piston which ensures that the speed of pressure decrease does not depend on the delivery rate of the piston pump.

The piston pump of the known braking pressure control device described in U.S. Pat. No. 4,715,666 comprises a stepped piston which isolates, with a large-diameter piston step, the working chamber that is adjacent to the piston end from a suction chamber which surrounds a smaller-diameter piston step, and to which the return line is connected. The working chamber and the suction chamber are interconnectible by an inlet valve arranged in the stepped piston. Towards the drive side of the stepped piston, the inlet chamber is bounded by an annular piston received over the stepped piston and engaged with a spring on a spring retainer formed on the stepped piston. Another spring is arranged between the spring retainer and the housing. The resiliently supported annular piston causes the suction chamber to function as a low-pressure accumulator which receives pressure fluid in excess when the inlet valve opens. The springs by which the annular piston and the stepped piston are supported on one another and on the pump housing are dimensioned such that the stepped piston moves into operative engagement with the drive eccentric only if pressure fluid is available in the suction chamber. It is thereby ensured that continued pressure fluid supply by the stepped piston will not occur when the suction chamber is pumped empty. Thus no vacuum may result in the return line and in the suction chamber so that air is not drawn into the braking pressure control circuit at the piston pump. It is a disadvantage in this known arrangement that the piston pump necessitates a comparatively complex structure.

It is known in high-pressure piston pumps for hydraulic systems as shown in DE-AS 23 36 118 and U.S. Pat. No. 2,845,029 to furnish the sealing means of the pump piston with an annular chamber from which a discharge channel leads either to the suction side of the pump or to the pressure fluid supply reservoir. This is meant to discharge leakage fluid and to prevent the ingress of air. These known high-pressure piston pumps are not suitable without modification for use on a braking pressure control device. When the discharge channel is led back to the reservoir, this necessitates further structure. When the discharge channel leads to the suction side, the ingress of air cannot be reliably avoided without taking special measures.

It is an object of the present invention to simplify the piston pump in a braking pressure control device of the type initially referred to and to ensure in doing so that the pressure in the return line does not fall below atmospheric pressure so that no air can enter through the piston seal of the piston pump.

SUMMARY OF THE INVENTION

This object is achieved according to the present invention in that the pump inlet valve and the pump outlet valve of the piston pump are arranged on the pump housing, in that the difference in pressure required for opening the inlet valve is sized such that the inlet valve remains closed once the pressure in the return line falls short of the atmospheric pressure, and in that an annular chamber encircles the piston at an axial location remote from the working chamber of the piston pump. The piston is sealed on a side of the annular chamber remote from the working chamber to prevent outflow of fluid in the housing portion containing the drive unit. The annular chamber communicates with a brake line connected to the pump outlet, or with the return line to direct fluid into the annular chamber and thus prevent air from leaking past the piston into the working chamber.

A braking pressure control device constructed according to this invention allows the piston pump to be operated continuously without the need for measures ensuring deactivation of the piston pump when the pump outlet valve is closed. Once the low-pressure accumulator is pumped empty, the higher opening pressure of the inlet valve will ensure that the pressure in the return line and, possibly, that in the brake line connected to the return line will not drop below atmospheric pressure so that the ingress of air into the brake line and retraction of the wheel cylinder piston is avoided.

Simultaneously, an ingress of air via the slide seal of the piston, with the pump inlet valve closed, is effectively avoided in that the slide seal of the piston is on its back side permanently surrounded by pressure fluid so that no air can be sucked in through the gap of the slide seal, not even when vacuum is prevailing in the working chamber.

When the annular chamber is in communication with the pressure side of the pump, the pressure in excess of atmospheric pressure prevailing during brake operation ensures that the annular chamber is filled sufficiently with pressure fluid. But even if the annular chamber is connected to the suction side of the pump, according to an alternative embodiment of the invention, the pressure in excess of atmospheric pressure preserved in the return line in the inventive brake slip control device will safeguard the necessary filling of the annular chamber and thus a reliable sealing to resist the intake of air by the pump.

The demands made on the design of the slide seal are diminished owing to this invention. The manufacturing effort for the piston pump is reduced above all in that there is no need for structural arrangements to disconnect the piston pump when the low-pressure accumulator is pumped empty, and in that the pump valves are arranged on the pump housing isolated from the pump moving parts. The connection between the annular chamber and the inlet-side supply line of the piston pump has the advantage that the seal between the annular chamber and the gear chamber is less stressed.

Furthermore, the inventive design of the braking pressure control device allows the low-pressure accumulator to be separate from the piston pump, both components thereby simplified, and the number of sealing points reduced as a result.

According to the present invention, the annular chamber encircling the piston can be formed by an annular groove recessed into the piston or into the surrounding piston bore. It can be provided further that the annular chamber is sealed in relation to the gear chamber by a sealing ring made of elastomeric material. In order to avoid pressure pulsations, the axial length of the annular chamber corresponds to the piston stroke so that the volume of the annular chamber cannot be varied by the stroke movement of the piston.

An embodiment of the present invention is illustrated in the drawing and will be described in more detail in the following.

DETAILED DESCRIPTION

Figure 1:
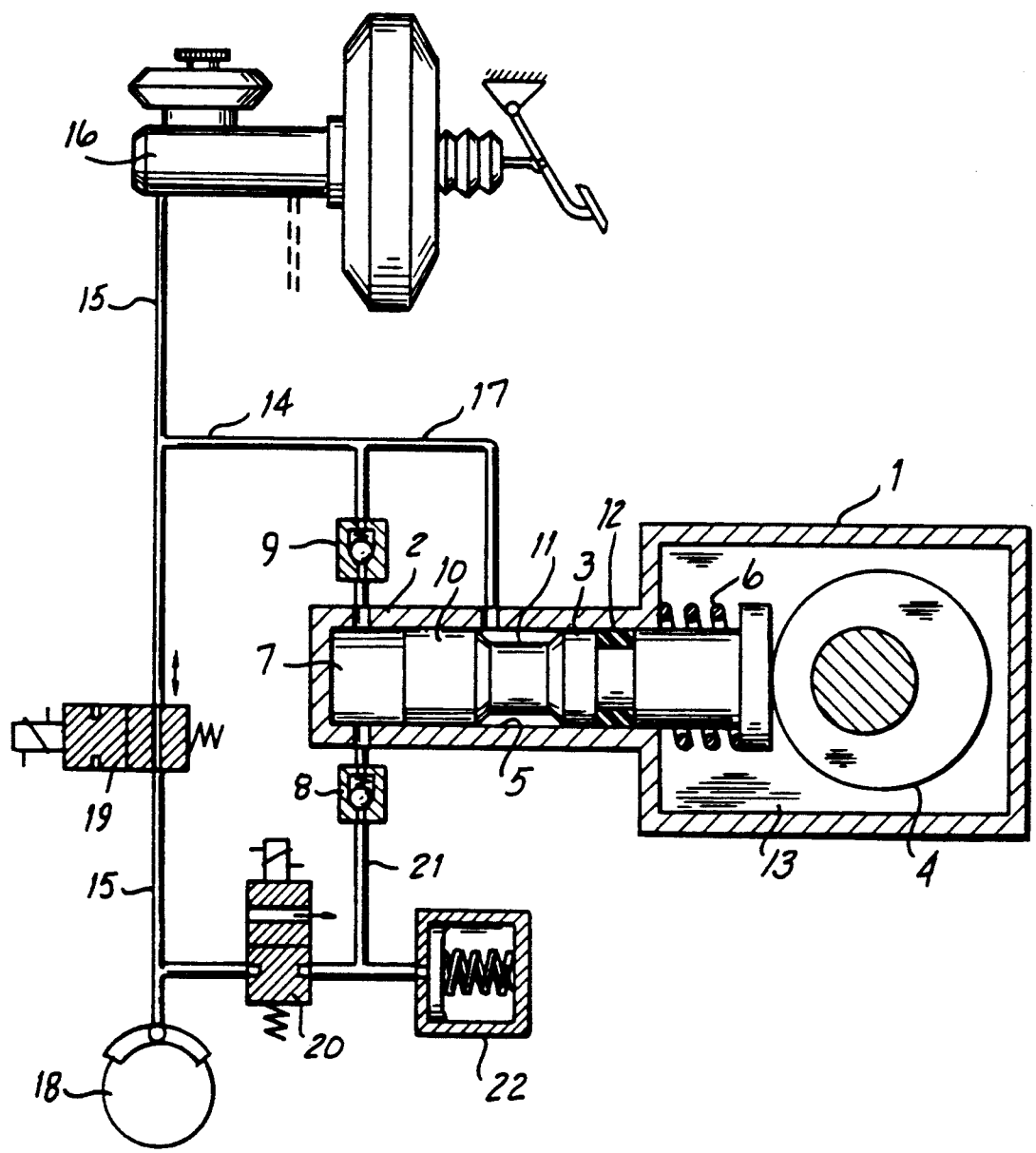
FIG. 1 shows a schematic cross-sectional view of an embodiment of an inventive braking pressure control device for a brake circuit of a hydraulic vehicle brake system to which a piston pump is connected.

The illustrated piston pump comprises a pump housing 1 with a pump cylinder 2, a piston 3 and an eccentric piston drive unit 4. The piston 3 is axially slidably movable in a piston bore 5 of the pump cylinder 2 and is urged against the cam curve of the eccentric piston drive unit 4 by a compression spring 6 supported on the housing 1. Piston 3 defines with one end a working chamber 7 which is also formed by the closed end of the piston bore 5 and which is connected to a pump inlet valve 8 and a pump outlet valve 9 which both are designed as spring-loaded non-return valves. The piston 3 comprises three differently designed sections lying within the piston bore 5.

The section 10 adjacent the working chamber 7 forms a slide seal which ensures the necessary sealing of the annular gap between the adjacent surface areas of the piston bore 5 and of the piston 3. As a variation, the slide seal may also comprise an elastic seal, in the form of a sealing ring.

The intermediate section of the piston 3 is provided with an annular groove by which an annular chamber 11 is formed whose axial length corresponds to the piston stroke so that the volume of the annular chambers 11 is not varied during stroking of the piston 3.

The section of the piston 3 protruding into the housing portion containing the eccentric piston drive 4 has a sealing ring 12 mounted thereon made of elastomeric material by which the annular chamber 11 is sealed in relation to the housing chamber 13 receiving the eccentric piston drive unit 4.

The one way pump outlet valve 9 is connected via a supply line 14 to a brake circuit 15 of a braking pressure generator 16 of a hydraulic vehicle brake system. The annular chamber 11 is also connected to the supply line 14 via a line 17. A wheel brake 18 is connected to the brake circuit 15 and is controllable via solenoid operated brake control inlet and outlet valves 19, 20. A pump supply line 21 leads from the solenoid outlet valve 20 to the one way pump inlet valve 8. Further the pump supply line 21 communicates with a low-pressure accumulator 22. The opening pressure of the pump inlet valve 8 is sized such that the pressure in the pump supply line 21 may not drop below the atmospheric pressure when the piston pump is running.

The braking pressure generator 16 and the components connected thereto via the brake circuit 15 are filled with pressure fluid and vented in the vehicle brake system illustrated. Air pockets are undesirable since they increase the fluid requirement on brake operation. The working chamber 7 and the annular chamber 11 of the piston pump are thus filled with pressure fluid as well. Atmospheric pressure is prevailing in the chambers connected with the braking pressure generator 16 when the brake is released.

The pressure predefined by the low-pressure accumulator 22 prevails in the supply line 21 isolated from the brake circuit 15 by the closed solenoid operated brake control outlet valve 20. The pressure in the working chamber 7 can be of different magnitude. It is dictated by the opening pressures of the pump inlet valve 8 and the pump outlet valve 9. When the pressure is low in the pump supply line 21, a pressure below atmospheric pressure may be caused in the working chamber 7, by cooling off. By the annular chamber 11 being in permanent communication with the supply line 14 air is prevented from entering into the working chamber 7 via the slide seal of the section 10 of the piston 3.

When the braking pressure on the wheel brake 18 is controlled during a braking operation by virtue of the solenoid operated brake control inlet and outlet valves 19, 20, the piston pump serves to return the pressure fluid, which was discharged during a braking pressure reduction via the solenoid outlet valve 20 out of the part of the brake circuit 15 connected to the wheel brake 18, into the part of the brake circuit 15 connected to the braking pressure generator 16 in which the braking pressure is maintained by simultaneously closing of the solenoid inlet valve 19. Once the solenoid inlet and outlet valves 19, 20 are switched back to assume their position shown in the drawing with a view to increasing the braking pressure again, a vacuum will occur on further operation of the piston pump in the working chamber 7 during the suction stroke if the pressure in the pump supply line 21 has dropped so far that the pump inlet valve 8 does not open any more. In this phase of operation, too, the pressure fluid available in the annular chamber 11 due to the connection to the pressure-side supply line 14 ensures that no air may enter into the brake system. It is therefore not required to deactivate the piston pump.

Figure 1A:
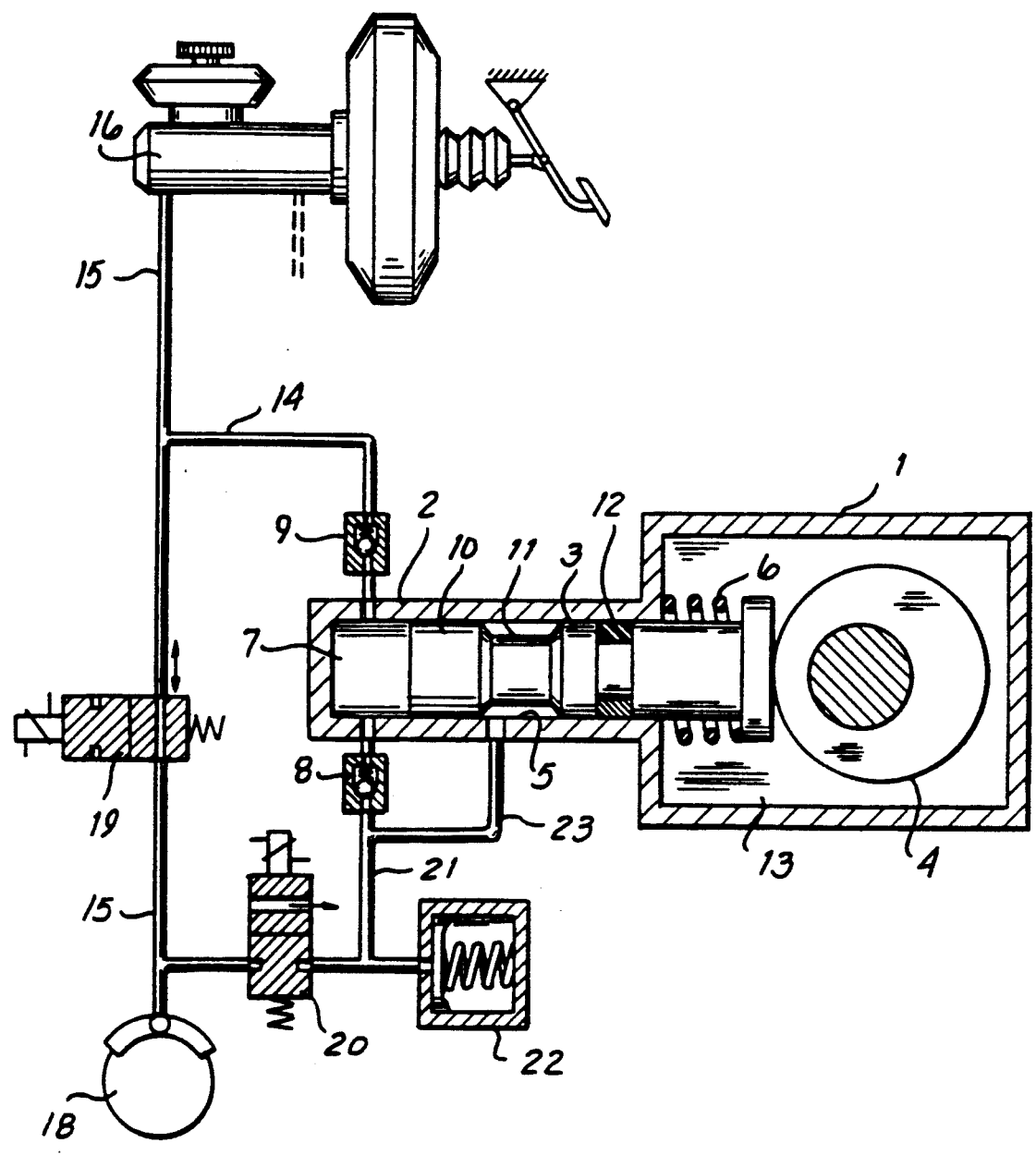
FIG. 1A is a schematic cross sectional view of alternate embodiment of the invention.

Instead of the connection of the annular chamber 11 via the line 17 to the supply line 14 on the outlet side, the annular chamber 11 can be connected to the pump supply line 21 on the inlet side via a line 23 shown in FIG. 1A as an alternative embodiment. This arrangement also reliably avoids the ingress of air into the working chamber 7. The opening pressure of the inlet valve 8 ensuring that the suction capacity of the piston pump is not sufficient to decrease the pressure in the supply line 21 below the atmospheric pressure so that the pressure in the annular chamber 11 also cannot go blow atmospheric pressure.

We claim:

1. A braking pressure control device for a hydraulic automotive vehicle anitlock brake system, comprising: a braking pressure generator, at least one wheel brake cylinder connected via a brake line with the braking pressure generator to actuate a brake, a braking pressure control circuit which is interposed into the brake line between the braking pressure generator and the wheel brake cylinder, and comprising a piston pump having an inlet and an outlet, said outlet connected to said brake line, an inlet brake control valve connected to said wheel brake cylinder via said brake line, an outlet brake control valve connected in a return line leading to said inlet of said piston pump, said pump including a housing, a piston axially movable in a cylinder bore in said housing, a mechanical piston drive enlarging one end of said piston, the other end of said piston defining a working chamber in said cylinder bore; a slide seal sealing said piston in relation to said cylinder bore in said pump housing, a pump inlet valve and pump outlet valve each connected to said piston pump working chamber, said pump outlet valve also connected to said brake line, said pump inlet valve also connected to said return line, said pump inlet valve opened by a predetermined pressure difference thereacross, said difference in pressure such that said pump inlet valve remains closed to said working chamber if the pressure in said working chamber is below atmospheric pressure, an annular chamber encircling said piston at an axial location on one side of said slide seal away from said working chamber, said annular chamber being sealed in relation to said housing portion containing said piston drive, said annular chamber communicating with one of said brake line or said return line.

2. A braking pressure control device as claimed in claim 1, wherein said annular chamber is formed by an annular groove extending around said piston.

3. A braking pressure control device as claimed in claim 1 wherein said piston adjacent said annular chamber is sealed in relation to said housing portion containing said mechanical piston drive by a sealing ring made of elastomeric material.

4. A braking pressure control device as claimed in claim 3, wherein the axial length of said annular chamber corresponds to the stroke movement of said piston.

* * * * *